US011933939B2

(12) United States Patent
Yi et al.

(10) Patent No.: US 11,933,939 B2
(45) Date of Patent: Mar. 19, 2024

(54) METALENS WITH ARTIFICIAL FOCUS PATTERN

(71) Applicant: THE REGENTS OF THE UNIVERSITY OF MICHIGAN, Ann Arbor, MI (US)

(72) Inventors: Ya Sha Yi, Troy, MI (US); Mao Ye, Dearborn, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 142 days.

(21) Appl. No.: 17/357,076

(22) Filed: Jun. 24, 2021

(65) Prior Publication Data
US 2021/0405257 A1    Dec. 30, 2021

Related U.S. Application Data

(60) Provisional application No. 63/043,413, filed on Jun. 24, 2020.

(51) Int. Cl.
*G02B 1/00*    (2006.01)
*G02B 27/42*    (2006.01)

(52) U.S. Cl.
CPC ............. *G02B 1/002* (2013.01); *G02B 27/42* (2013.01); *G02B 2207/101* (2013.01)

(58) Field of Classification Search
CPC . G02B 1/00; G02B 1/02; G02B 1/002; G02B 5/18; G02B 5/1842; G02B 5/1857; G02B 5/1828; G02B 5/1819; G02B 5/1847; G02B 5/00; G02B 5/008; G02B 27/00; G02B 27/0037; G02B 27/42; G02B 27/4211; G02B 3/0087; G02B 2207/101; B82Y 10/00; B82Y 20/00; B82Y 30/00
USPC ....... 359/569, 565, 573, 566, 576, 315, 240, 359/244, 238, 276, 275, 278–280; 977/773, 774, 712, 721, 723
See application file for complete search history.

(56) References Cited

U.S. PATENT DOCUMENTS 10,712,554 B2 *    7/2020    Arbabi ............... G02B 27/0031
2020/0096672 A1 *    3/2020    Yu ........................ G02B 5/1871

OTHER PUBLICATIONS

"Why Metalenses Are About To Revolutionize Chip-Making", Emerging Technology from the arXiv, MIT Technology Review, Jul. 9, 2019.

* cited by examiner

*Primary Examiner* — Jie Lei
(74) *Attorney, Agent, or Firm* — Harness, Dickey & Pierce, P.L.C.

(57) ABSTRACT

A metalens configured to shape the focus light into a flexibly designed pattern. The present teachings demonstrate the engineering of metalens with artificial focus pattern by creating line and ring-shaped focus as 'drawing tools'. These metalens are fabricated through a single layer of silicon-based material through CMOS compatible nano fabrication process. The mechanism to generate artificial focus pattern can be applied to a plethora of future on-chip optical devices with applications ranging from beam engineering to next generation nano lithography.

15 Claims, 11 Drawing Sheets

METALENS WITH ARTIFICIAL FOCUS PATTERN

CROSS-REFERENCE TO RELATED APPLICATIONS

This application claims the benefit of U.S. Provisional Application No. 63/043,413, filed on Jun. 24, 2020. The entire disclosure of the above application is incorporated herein by reference.

GOVERNMENT INTEREST

This invention as made with government support under ECCS1428069 awarded by the National Science Foundation. The government has certain rights in the invention.

FIELD

The present disclosure relates to a metalens with artificial focus pattern.

BACKGROUND AND SUMMARY

This section provides background information related to the present disclosure which is not necessarily prior art. This section provides a general summary of the disclosure, and is not a comprehensive disclosure of its full scope or all of its features.

Emerging optical metasurfaces comprised of a thin layer of nano structures are reported with exceptional control over wavefront. Through precise engineering of phase, polarization, and amplitude, metasurfaces enable miniaturization of traditional bulk optical devices to thin planar structures. The transformation of traditional focusing lens into a metalens has attracted intense interest due to its widespread application in the field of imaging and sensing (cameras, microscopy, displays and sensors). To date, metalens have been reported with comparable performance of a commercial objective including functions of achromatic, wavelength tunability, and polarization insensitive/distinguishing characteristics. Previous studies are successful on achieving functionalities of traditional lens or lens sets through careful engineering of nano phase shifters. While in this work, we have discovered that these nano structures (e.g. metalenses) have far more promise and potential than just accomplishing traditional point focusing behavior.

According to the principles of the present teachings, a metalens is provided that enables focusing light onto an artificial and flexible designed pattern instead of a point. The shaping of focus is achieved by introducing extra spatial information into the phase reconstruction formula that enables focusing light into a pattern with designed focal length. As a result, the focus pattern created shares the property of a focus such as diffraction limitation. This is a novel and different approach, compared with other metasurface based pattern-generation method such as holography, where pattern is created by recording (iteration) of an existing pattern's phase profile. In order to successfully achieve the artificial focus patterns and demonstrate our proof of concepts, we have utilized both grating- and cylinder-based phase shifter design to show their feasibilities in applications on different targeting patterns. Two metalens are designed and fabricated with focus pattern 'U' and 'M' respectively for the proof of concept. The average numerical aperture (NA) is 0.8 (NA may vary at different locations on the focus pattern), and the size is 40×60 μm for 'U'-shaped focus metalens and 44×80 μm for 'M'-shaped focus metalens. Both lenses are characterized under 685 nm incident light and the designed patterns are generated 15 μm away from lens (focal length=15 μm).

Metalens are designed through space discretization and phase construction process. The lens plane is first discretized into subwavelength-sized pitches (period). Within each period, high refractive index material is filled with varied fill factor to tune the effective index (or Pancharatnam-Berry phase) which ultimately controlled the phase shift of this region (e.g. generation of dimension variant phase profile). Conventional point-focused metalens can be designed by matching dimension-variant phase profile to the space-variant phase profile with focusing effect (Eq. 1).

$$\Phi(x, y) - \Phi(0, 0) = \frac{2\pi}{\lambda}\left(\sqrt{x^2 + y^2 + f^2} - f\right) \quad (1)$$

Where x, y, λ, and f are space coordinate, incident wavelength and focal length. In this way, light is focused as a point. While recent studies seeking for the accomplishment of traditional focusing behaviors through metalens, the present teachings, instead of focusing light to a point, uses metasurface enabled focusing of light into a designed pattern. The method of artificial focus pattern brings extra flexibility to optical metasurface can potentially be applied to a plethora of future applications.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
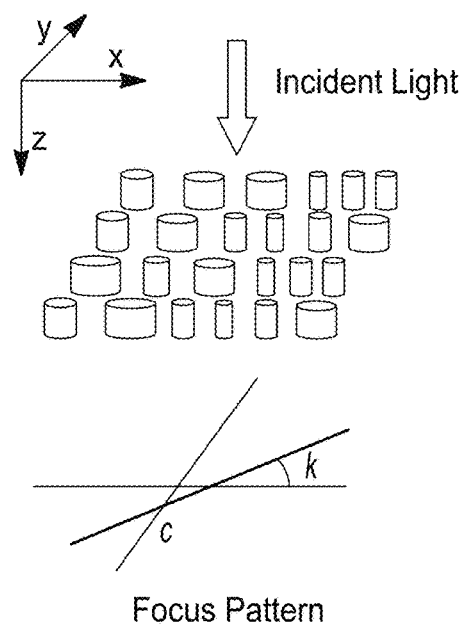
FIG. 1A is a schematic graph of metalens creating line-shaped focus.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature(s) relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Metalenses, as one of the most popular applications of emerging optical metasurfaces, have raised widespread interest recently. With nano structures fully controlling phase, polarization, and transmission, metalenses have achieved comparable performance of commercial objective lenses. While recent studies seeking traditional focusing behaviors through metalens are successful, in the present disclosure it has been discovered that instead of focusing light to a point, metasurfaces further enable shaping the focus into a flexibly designed pattern, with more promise and potential. New mechanisms and generalizations of conventional point focused metalens guiding principles are presented with metalenses concentrating light to artificial focus pattern.

By non-limiting example, the present disclosure demonstrates the engineering of metalens with artificial focus pattern by creating line- and ring-shaped focus as drawing tools. Herein, an exemplary metalens with 'U' and 'M' shaped focus are characterized for proof of concepts. In some embodiments, these metalenses are fabricated through a single layer of silicon-based material through CMOS compatible nano fabrication process. The mechanism to generate artificial focus pattern can be applied to a plethora of future on-chip optical devices with applications ranging from beam engineering to next generation nano lithography.

Principle of Artificial Focus Pattern Design.

Figure 1B:
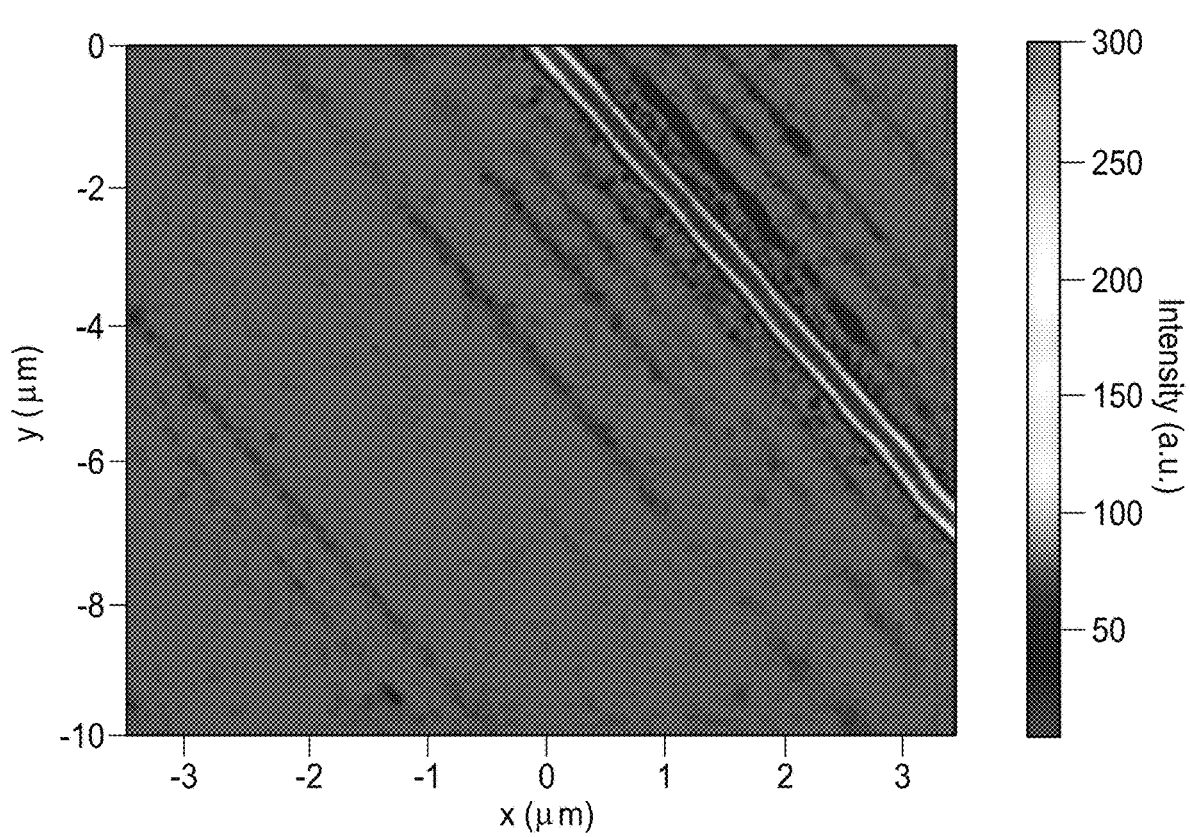
FIG. 1B is a finite difference time domain (FDTD) simulation of an example of line-shaped focus by combining Eq. (2) and Eq. (3) with k=−2, c=0.
Figure 5:
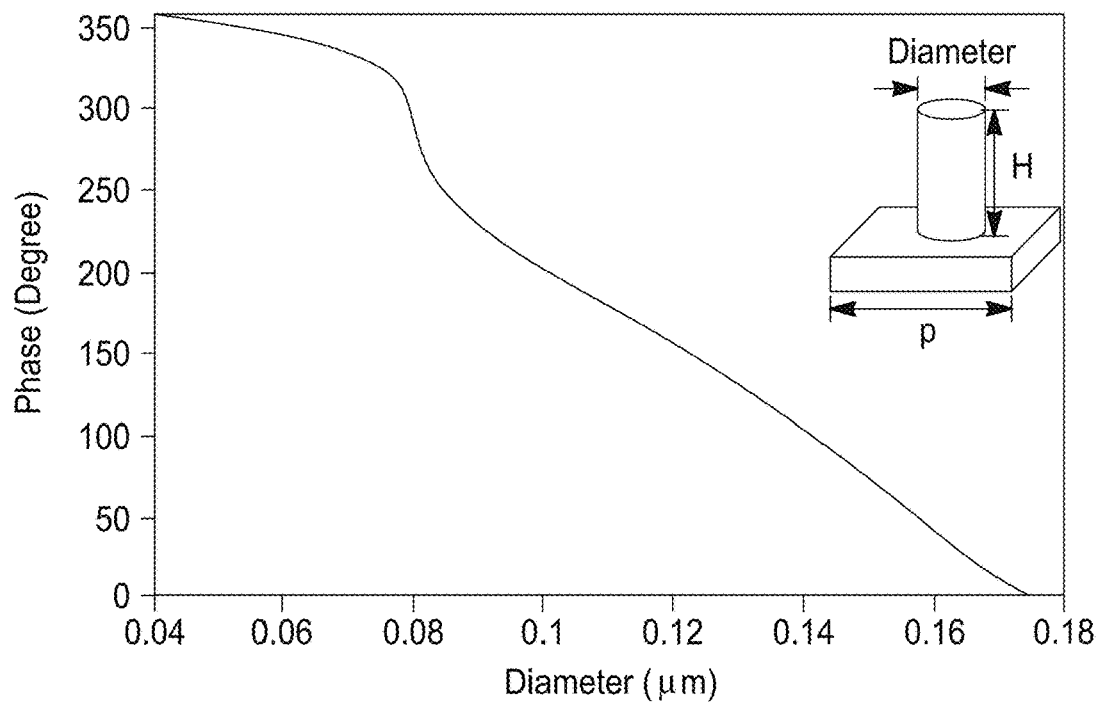
FIG. 5 illustrates phase relation of nano cylinder phase shifters, wherein the nano cylinders are designed with SiNx material (n=2.74, k=0) under 220 nm of square shaped period (P), 600 nm thickness (H).

In order to focus light into a pattern, an extra spatial relationship is induced into the phase profile. For a line-shaped focus with controlled orientation, the phase profile can be represented by Eq. (2) and Eq. (3):

$$\Phi(x, y) - \Phi(0, 0) = \frac{2\pi}{\lambda}\left(\sqrt{(x + a(y))^2 + f^2} - f\right) \quad (2)$$

$$-a(y) = \frac{y - c}{k} \quad (3)$$

where k and c are the slope and spatial constant of line-shaped focus at x-y focal plane (FIG. 1A), and a(y) is a function of the coordinate y. Eq (2) is creating focus with off-axis parameter a(y) and this parameter is a function of coordinate y. An example of line-shaped focus created by combining Eq. 2 and Eq. 3 is shown in FIG. 1B where a line-shaped focus is created with k=−2, c=0. The metalens (10×10 μm sized) is designed through propagation phase with cylindrical shaped nano structure (FIG. 1A), and the pattern is created 6 μm away from lens plane (detailed phase-structure information is shown in FIG. 5).

Figure 1C:
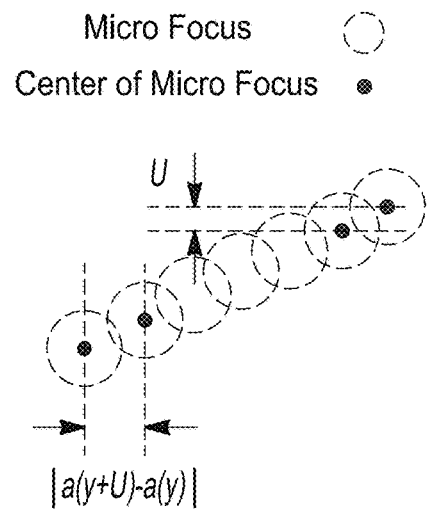
FIG. 1C is an illustration of the mechanism of creating focus pattern through 'micro focus' overlapping.

We can intuitively understand this focus pattern (FIG. 1B) as a result of 'overlapping' of multiple 'micro focuses'. To be specific, based on Eq. (3), the function a(y) is varied based on the phase shifter's y coordinate. In this case, phase shifters with same y coordinate (e.g. each line) can be considered as a 'micro metalens'. These metalens generate off-axis focus based on the value of a(y). Due to close distance between adjacent focuses, these focuses become overlapped and form continuous pattern, which is shown in FIG. 1C. The distance between adjacent 'micro focus' can be calculated as:

$$D(y) = \sqrt{(a(y + U) - a(y))^2 + U^2} \leq \frac{\lambda}{2NA(y)} \quad (4)$$

where U (220 nm) and NA(y) are pitch (period) size and numerical aperture, D(y) is the distance between adjacent 'micro focus' created by adjacent 'micro metalenses'. Note that the NA(y) in Eq. (4) is the numerical aperture of the 'micro metalens', which is also a variable of y coordinate. And due to the diffraction limited size of 'micro focus', D(y) has to be smaller than the Abby's diffraction limit.

Figure 1D:
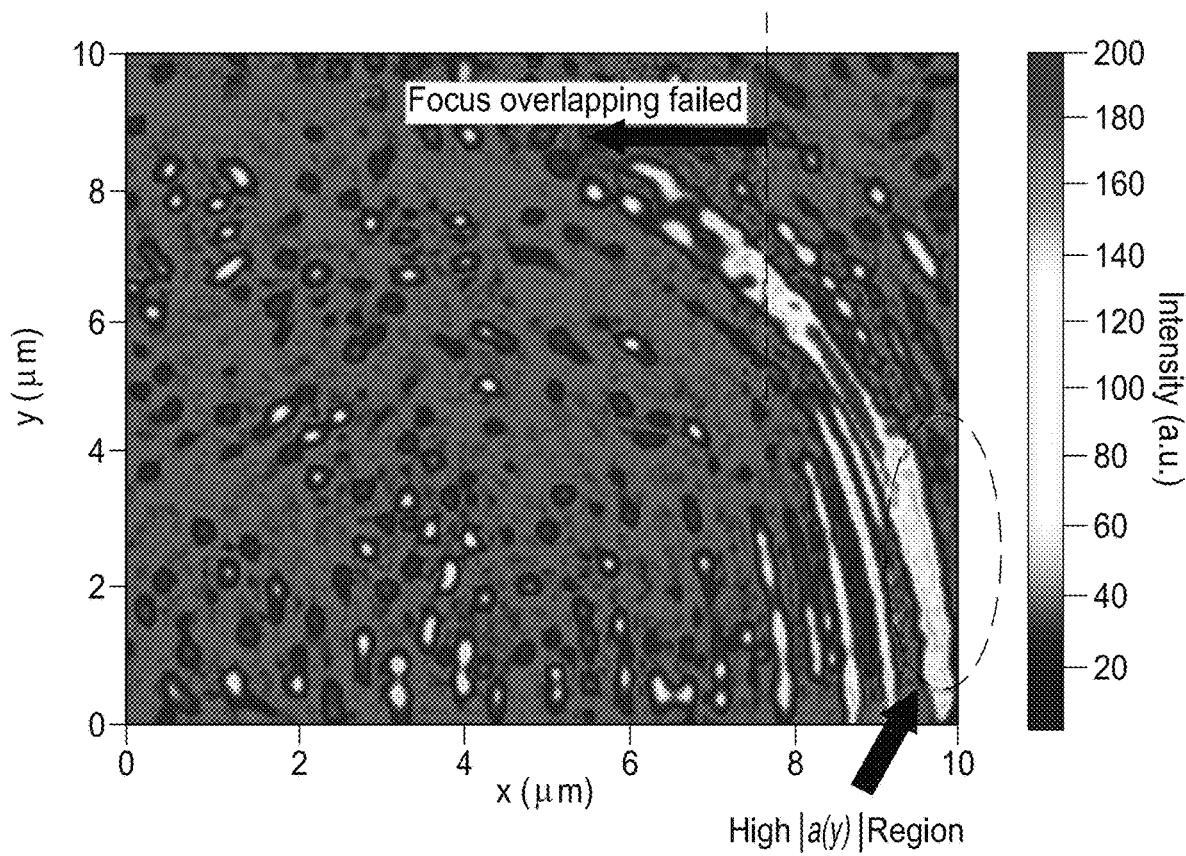
FIG. 1D is an FDTD simulation of arc shaped focus by combining Eq. (2) and Eq. (5).

With this approach, we are able to create line-shaped focus across the focal plane (FIG. 1B). While, as we discovered, simply engineering a(y) (Eq. 3) will not render desired focus pattern even when the criterion of Eq. (4) is satisfied. To better illustrate this issue, we have designed an arc-shaped focus by modifying Eq. (3) to $$-a(y) = \sqrt{r^2 - y^2} \quad (5)$$

where r (10 μm) is the radius of the arc. This metalens is designed under same size (10×10 μm) and focal length (6 μm). The field distribution at focal plane is shown in FIG. 1D. In this example, the distance between adjacent focuses D(y) increased due to the increase of y coordinate, and the arc structure disappeared at y>6 μm due to dissatisfaction of Eq. 5. However, counterintuitively, the intensity of arc does not follow an inverse relationship with D(y). To be specific, the intensity of artificial focus pattern is related to D(y), as smaller D(y) indicates closer packing of adjacent 'micro focuses' which intuitively may render higher intensity. While shown in FIG. 1D, region with lower D(y) (y=0~3 μm, D(y)=2.4~68.4 nm) shows lower intensity compared with regions around y=5 μm (D(y)=132.9 nm).

Figure 2A:
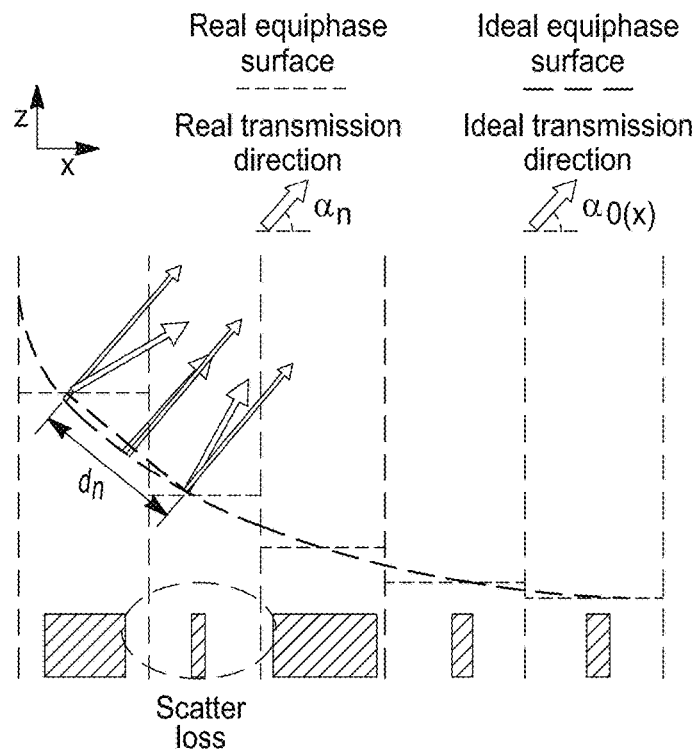
FIG. 2A is an illustrative diagram of the focusing mechanism of the metalens and the generation of phase discontinuity from space discretization.
Figure 2B:
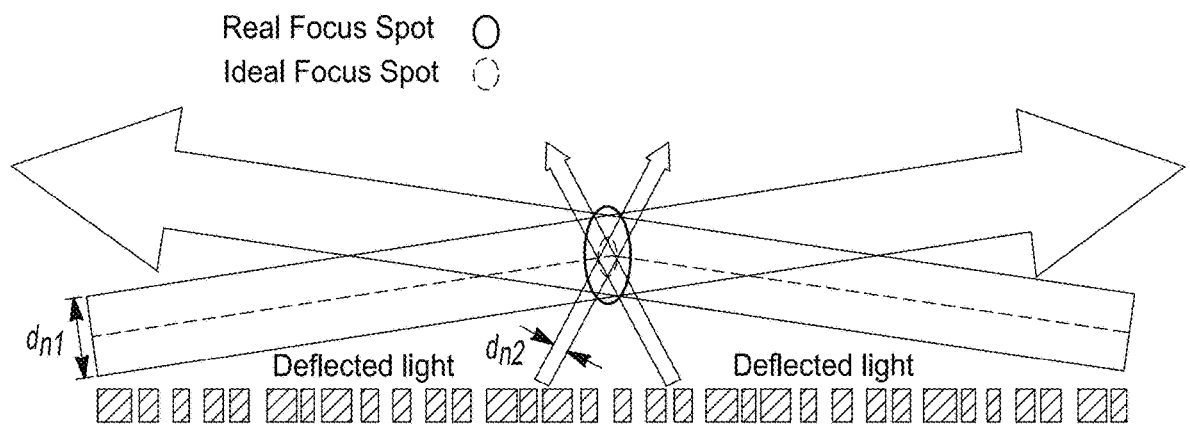
FIG. 2B is an illustrative diagram of the influence of space discretization on focusing behaviors of metalenses, where $d_{n1} \gg d_{n2}$ results in the real focus created by metalens being bigger than ideal focus.

To better understand the underline mechanism, we demonstrate part of metalens in 2D as FIG. 2A. Metalens is designed through space discretization and phase reconstruction method, and the focusing performance is achieved through a discontinuous phase profile. By shrinking the pitch (period) size into deep subwavelength range, researchers are attempting to minimize the influence induced through phase discontinuity. However, phase discontinuity always has an effect on the focusing performance, and this effect becomes more obvious for high NA metalens. As shown in FIG. 2A, ideal equiphase plane in 2D remains constant curvature (based on Eq. 1), and the ideal transmission angle α0(x) varies continuously as it is always perpendicular to equiphase plane. While for metalens, there exist step-phase variations over space (FIG. 2A). If we assume equilibrium media within period (phase shifted within each period remains the same), then an average transmission angle (αn) can be demonstrated by connecting the center of adjacent equiphase plane. As a result, the focus of metalens is formed by a number of finite-narrow beams with different transmission angle. And the width of each beam dn is given by $$dn = \frac{U}{\sin a_n} \quad (6)$$

where we assume the lens comprised of 2(N+1) periods and αn is the angle shifted between nth and (n+1)th period. Due to the limitation of material and nano fabrication, the pitch size U is cannot be infinitely small. As a result, for high NA metalens that comprises small an region, dn can be a value much larger than the diffraction limitation. For example, if we consider a metalens designed under visible wavelength with U=0.35 μm (conventional size for TiO$_2$ based metalens), the largest beam width at its edge for NA=0.9 can render dN=0.802 μm, and it reaches dN=2.48 μm at NA=0.99. Large dn may render a much larger focus with decreased intensity depicted in FIG. 2B.

Figure 2C:
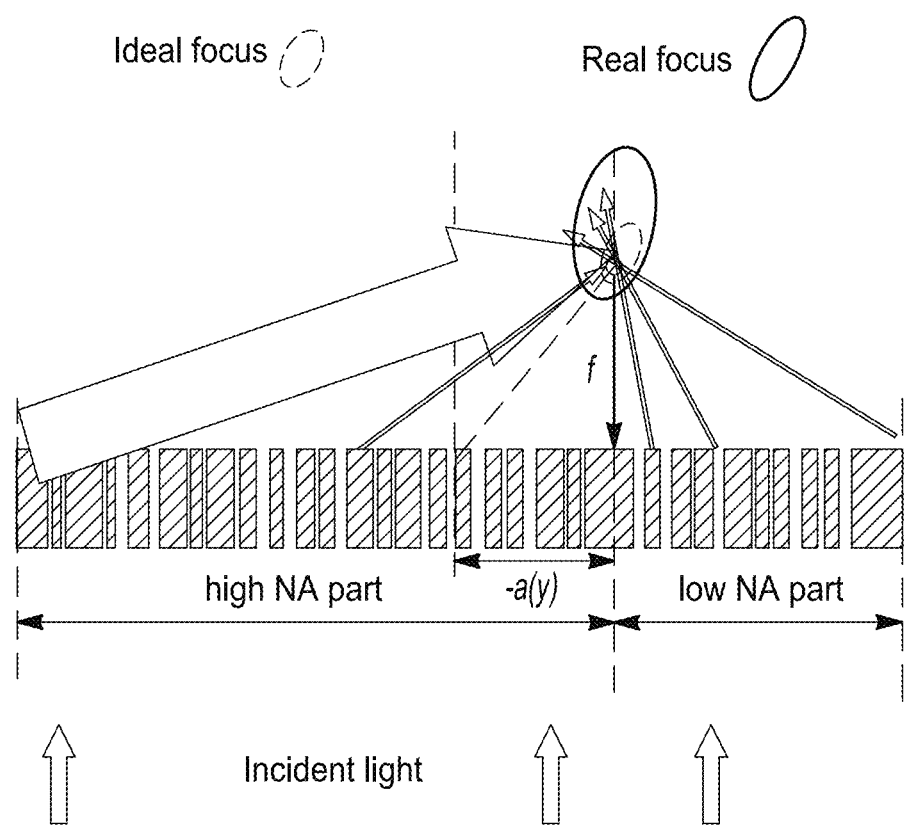
FIG. 2C is an illustrative diagram of focusing mechanism for off-axis metalens, which is a basic element of our artificial focus pattern.

A metalens with off-axis focus can be considered as a combination of half-of-two metalenses with different NA but same focal length as shown in FIG. 2C. Due to the increasing value of dn, beam coming from high NA part is concentrated to a larger area, which increased the size of focus and bring a decrease to focused power.

In our artificial focus pattern design, the focus is formed by a series of off-axis 'micro focus'. For focus generated with large |a(y)|, there exist a high NA part of metalens which rendered the effect depicted in FIG. 2C (e.g. the focused power is reduced for 'micro metalens' comprised of large |a(y)| component). And this explained the issue we aforementioned for the arc-shaped focus (FIG. 1D) where lower D(y) rendered lower focused power.

The diminishing of focus power problems are inherent drawbacks from space discretization, which can only be significantly improved when the pitch (period) size is reduced. In addition, based on the mechanism discussed in FIG. 2, the focused intensity is varying as a function of a(y). However, for the design of artificial focus pattern, it is important to maintain features with similar focused intensity across the whole pattern. In this application, we modified the Eq. (2) to $$\Phi(x, y) - \Phi(0, 0) = \frac{2\pi}{\lambda}\left(\sqrt{(x + a(y))^2 + (f + s(y))^2} - (f + s(y))\right) \quad (8)$$

In Eq. (8), we add the focal shift component s(y) as a modifier of focal length. The application of s(y) is to tune the focused intensity for each 'micro metalens' in pursuit of a focused pattern with homogenous intensity at designed focal plane. The value of s(y) can be acquired through simulations based on 'micro metalens' with different a(y).

Design and Characterization of 'M' Shaped Focus.

Figure 3B:
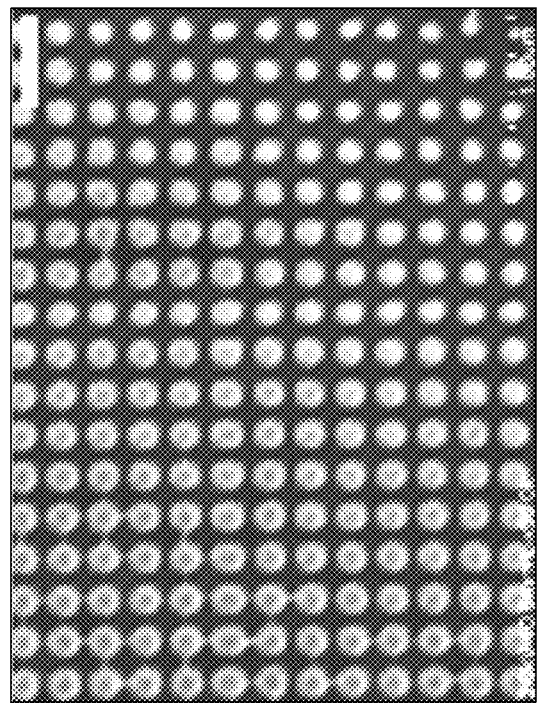
FIG. 3B is a magnified view of the lens which shows the structure of the cylinder phase shifter, size of scale bar is 500 nm. Both SEM picture are taken after gold sputter.
Figure 3A:
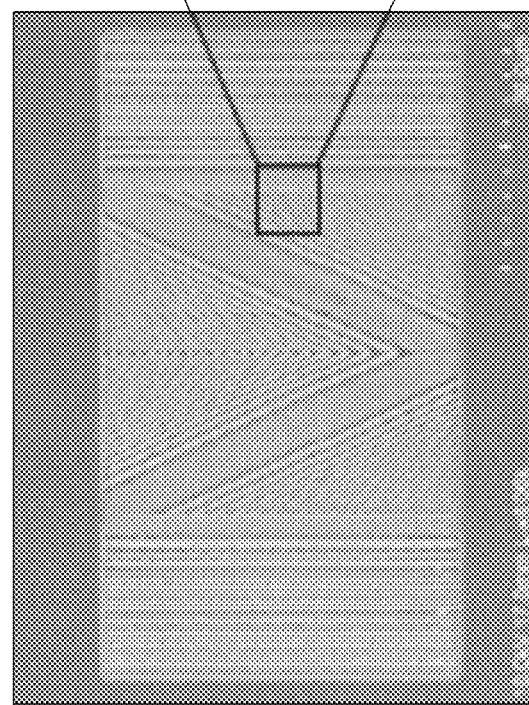
FIG. 3A is an SEM picture of the overall structure of the metalens.

A metalens with 'M'-shaped focus is designed using cylinder nano structure with feature size around 40 nm and thickness of 600 nm. The lens is fabricated with silicon rich silicon nitride material and its structure is characterized through scan electron microscopy (SEM) and shown in FIGS. 3A and 3B. The size of metalens is 44×80 μm with targeting 40×40 μm sized 'M' shaped focus.

Figure 3C:
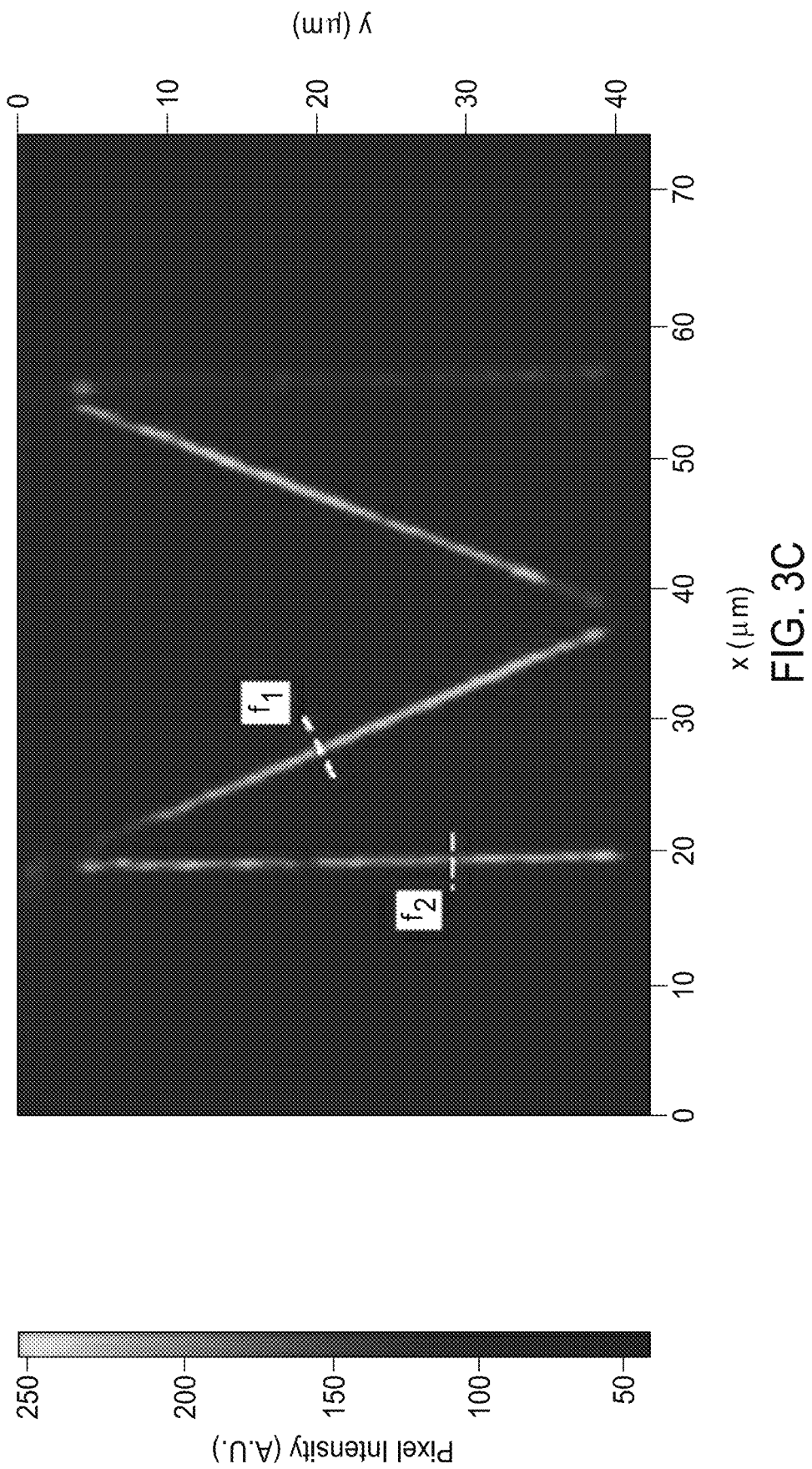
FIG. 3C is a characterized focal plane with incidence of 685 nm red light, two cross-sections are specified.

This lens is designed with 685 nm incident wavelength, and the whole pattern is aligned through Eq. (8). The characterized focus pattern is formed on the designed focal plane 15 μm away from lens (shown in FIG. 3C). A clear 'M' shaped focus is formed at the designed focal plane (FIG. 3C). One side line of 'M' is blur which may cause by defects of nano fabrication as can be observed in FIG. 3B that some nano cylinder is interconnected.

Figure 3D:
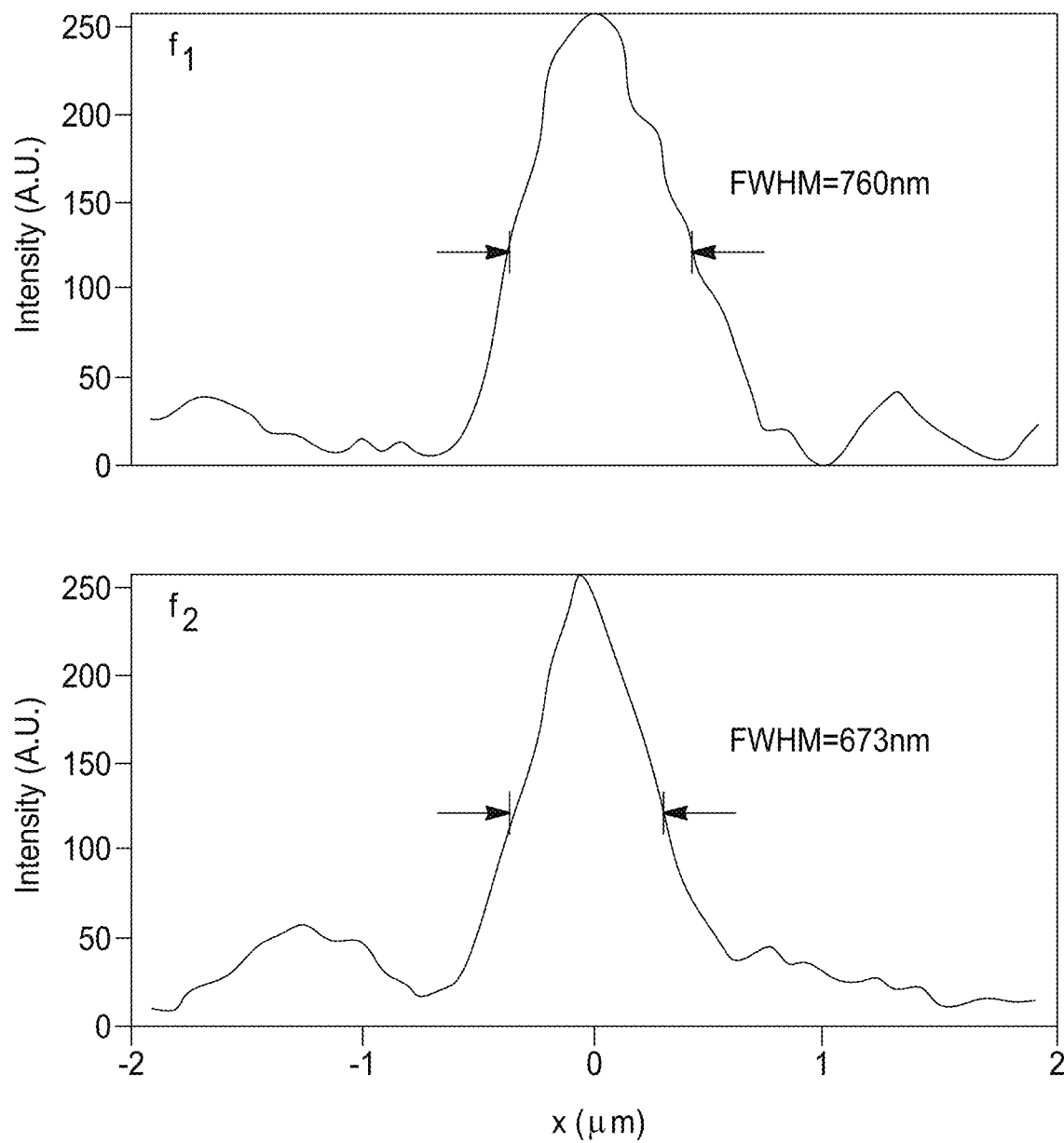
FIG. 3D is a focus profile at two cross-sections specified on 'M shaped focus.

Shown by FIG. 3C, the tilted line of 'M' exhibits a similar brightness, and this is caused by the adjustment of intensity from Eq. (8), that the intensity variation from varying a(y) is aligned to a similar level. The focus profile at cross-sections in FIG. 3C is shown at FIG. 3D. As shown, the full-width-at-half-maximum (FWHM) of both cross-sections are larger than the size of diffraction limited focus (NA varies from 0.6 to 0.8). This is due to the influence of space discretization as discussed in FIG. 2, that the size of off-axis 'micro focus' is larger than the Abby's diffraction limit. In addition, the f1-cross section shows larger FWHM than f2-cross section. This is because the tilted line of 'M' has a generally larger varying a(y) along its structure, and the alignment of intensity through Eq. (8) is subjected to a focal length modifier s(y). As a result, there exists larger focal shifts for a number of 'micro focuses' which further rendered a larger FWHM, while the intensity of whole structure is also aligned at similar level through this approach.

Design and Characterization of 'U' Shaped Focus.

Shown by FIG. 1D, a good curve-shaped focus cannot be generated simply from altering a(y) through Eq. (5). Even though Eq. (8) provides enough tunabilities on focus shaping and intensity, the creation of a curve-shaped focus requires a dynamic optimization process for a(y) and s(y), which is complicated and time consuming.

Figure 4A:
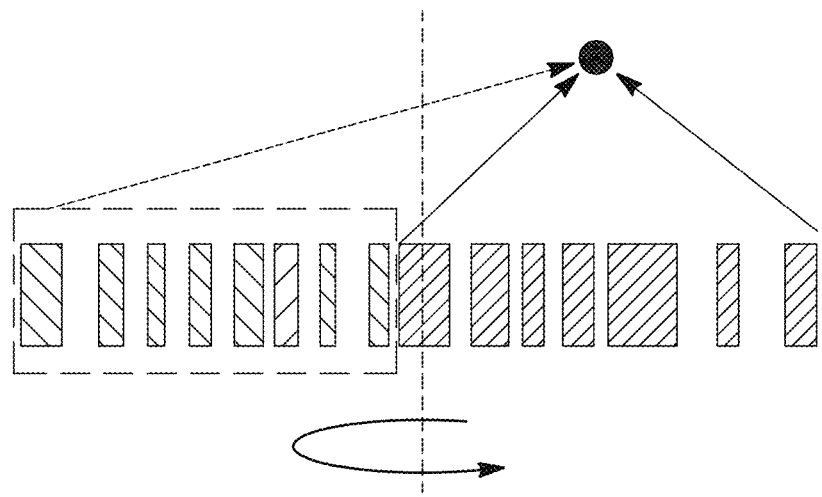
FIG. 4A is a design mechanism of the curve-shaped focus.

While a simpler approach can be applied in pursuit of curve-shaped focus, here we propose a method that generate focus pattern through grating-based metalens with basic mechanisms shown in FIG. 4A. In FIG. 4A, we demonstrated an off-axis focused metalens in 2D. Since phase shifters deflect light individually, the focus remains if half of its phase shifters are discarded. A ring-shaped focus can be generated by rotating this structure (FIG. 4A) along its central axis (curve structure with certain curvature can be generated by rotating this structure with certain angle).

Figure 4B:
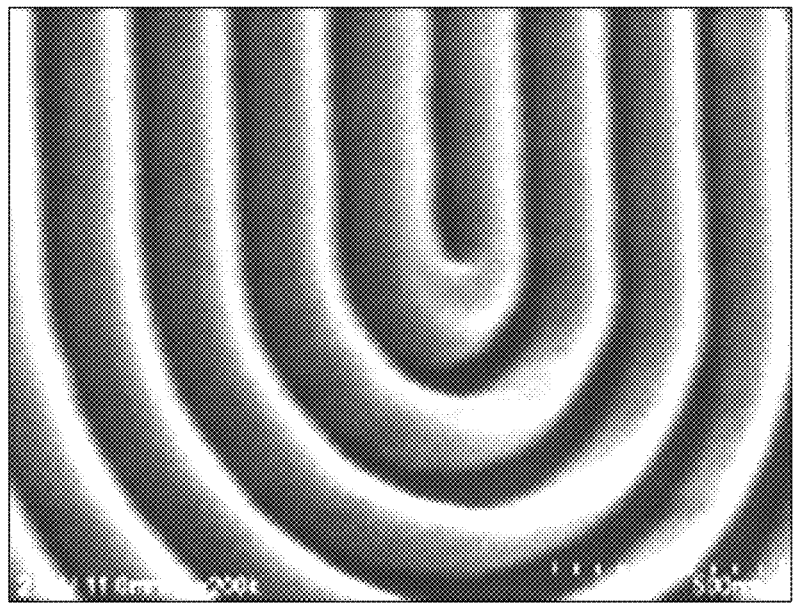
FIG. 4B is an SEM image (viewing angle tilted 30°) of the 'U' shape focused metalens, size of scale bar is 100 nm.
Figure 4C:
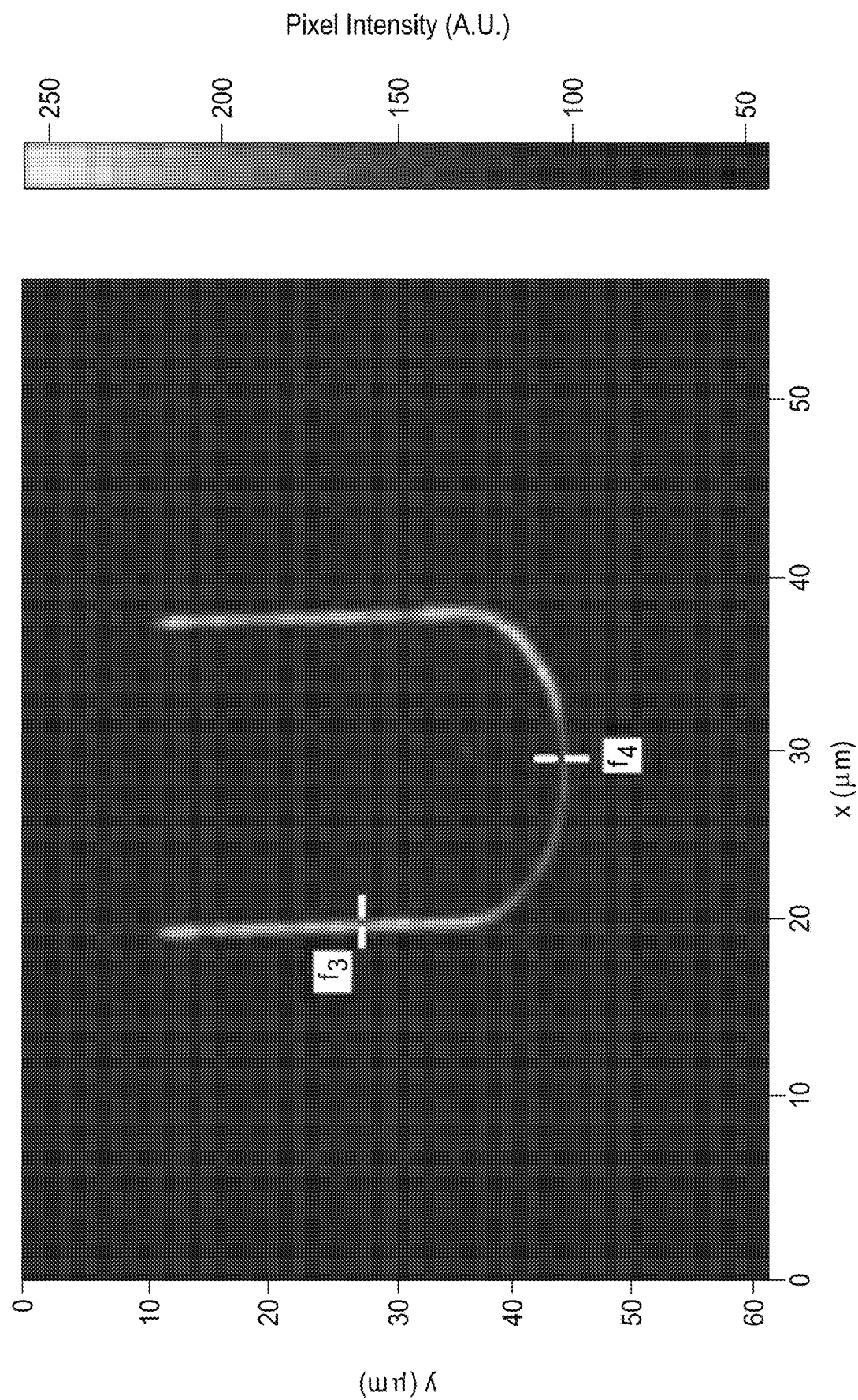
FIG. 4C is a characterized focal plane with incidence of 685 nm red light, two cross-sections are specified on the 'U' shaped focus.
Figure 4D:
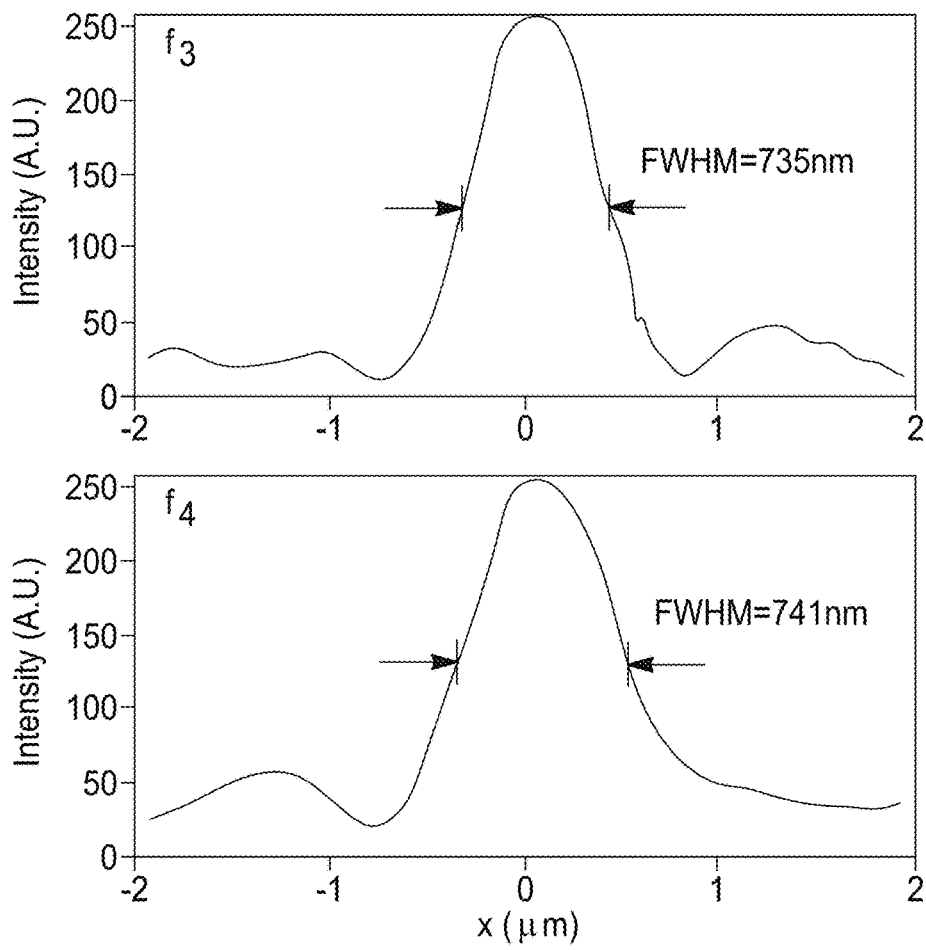
FIG. 4D is a focus profile at two cross-sections specified respectively.

Based on this mechanism we have designed a metalens with 'U'-shaped focus. This metalens is built with gratings and the basic structure fabricated is shown in FIG. 4B. The size of the metalens is 40×60 μm with feature size around 40 nm and thickness of 600 nm. A 'U' shaped focus is formed 15 μm away from lens plane. The characterized focal plane is shown in FIG. 4C, and the focus profile of two cross-sections is shown in FIG. 4D. A clear 'U' shaped focus can be observed on FIG. 4C, under 685 nm circularly polarized incidence. For this grating-based focus-pattern metalens, a(y) remains the same for both vertical lines and the curve of 'U'. This is the reason that both FWHM at $f_3$ and $f_4$ cross-sections are nearly the same (FIG. 4D). Note that the curve focus created by grating structure is polarization sensitive, and an equilibrium distribution of intensity along the curve can only be achieved under circular-polarized incidence.

We have proposed and demonstrated a new approach to create metalens that focus light to an artificially designed pattern instead of a point (i.e. a non-point specific pattern). Two basic mechanisms of generating artificial focus patterns are presented. Metalens with 'M' and 'U' shaped focus is fabricated and characterized for the proof of concept. During our study, we have discovered that metalens' inherent phase discontinuity has major influence on the performance of focus pattern. This results in the modification of phase construction equation with space-variant focal length modifier in pursuit of homogeneous focused intensity. New equation (Eq. 8) is presented to achieve flexible designed focus pattern, but the idea of overlapping multiple 'micro focus' to generate focus pattern can be applied to various design as long as the requirements discussed is fulfilled.

Lens with artificial focus pattern can potentially benefit a plethora of applications that involve beam engineering. A wide range of patterns can be generated by combination of basic elements, such as 'point', 'line' and 'curve' that bring extra degrees of flexibility to beam shaping. In addition, due to the large energy density that concentrates on the pattern, metalens of this kind can potentially be applied to next generation nano-lithography with targeted pattern imprinted on the lens.

Even though the phase shifter we applied for 'M' patterned focus is cylinder-shaped, which in many cases is considered as polarization-insensitive, there still exist difference in incident polarization due to the anisotropic discretization of pitch (period). And the grating based artificial focus pattern is polarization dependent, due to major phase difference under different incident polarization.

Both designs we have demonstrated are based on the engineering of propagation phase through modification of effective index within each periodicity. Similar design can also be achieved through Pancharatnam-Berry phase shifters. Even though this study is based on single wavelength, strategies for achromatic metalens design can also be applied to the phase shifters which may render achromatic artificial focus pattern.

FDTD Simulation.

Three-dimensional finite difference time domain (FDTD) method (Omnisim, Photon Design Ltd.) is applied for all the simulation in this study. Perfect match layer (PML) is applied on all boundaries of simulation window to truncate simulation space. Refractive index of SiNx substrate and air are 2.74 and 1 respectively. Imaginary part of refractive index for glass and air are set zero, sufficient small grid size and sufficient long simulation times are applied for the simulation.

Nano Fabrication of Metalens.

Figure 6:
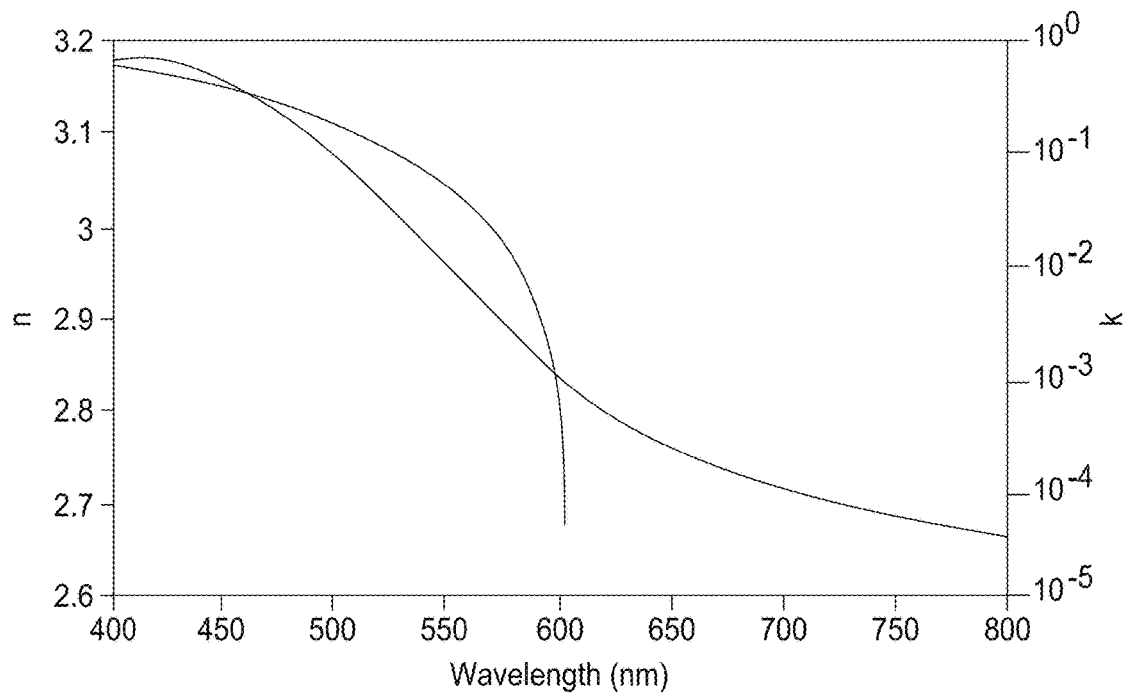
FIG. 6 illustrates optical property of metalens material (silicon rich silicon nitride), n=2.74, k=0 at 685 nm, deposited through PECVD.

In some embodiments, a silicon rich silicon nitride (SiNx, n=2.74) layer with thickness of 600 nm is deposited on the substrate of glass wafer as lens material. Detailed optical property of this material is shown in FIG. 6. Then a 230 nm thick SiO2 layer is deposited on top of SiNx layer as a hard mask. Both depositions are achieved through plasma enhanced chemical vapor deposition (PECVD). A photoresist layer (ZEP520A) of 200 nm thick is spin coated on top of SiO2 layer. The 2-D lens pattern is written by E-beam and the pattern is created on the photoresist after development. The lens structure is then transferred into SiO$_2$ hard mask layer by reactive ion etching (R.I.E.) and the residual photoresist is stripped by O2 plasma stripper. The pattern is finally transferred into silicon rich silicon nitride layer by another reactive ion etching process. The selectivity of SiNx/SiO₂ is around 2.0 with the application of 20% of SF6 concentration during reactive ion etching.

The reason for our utilization of SiO₂ layer as hard mask is because there is no E-beam photoresist available (at 200 nm thickness) to provide enough selectivity versus SiNx to achieve direct R.I.E. with 600 nm depth. While the thickness of E-beam resist is limited by our feature size of 40 nm. As a result, a two-step R.I.E. process with hard mask is necessary for the fabrication of this metalens.

Characterization of Metalens.

Figure 7:
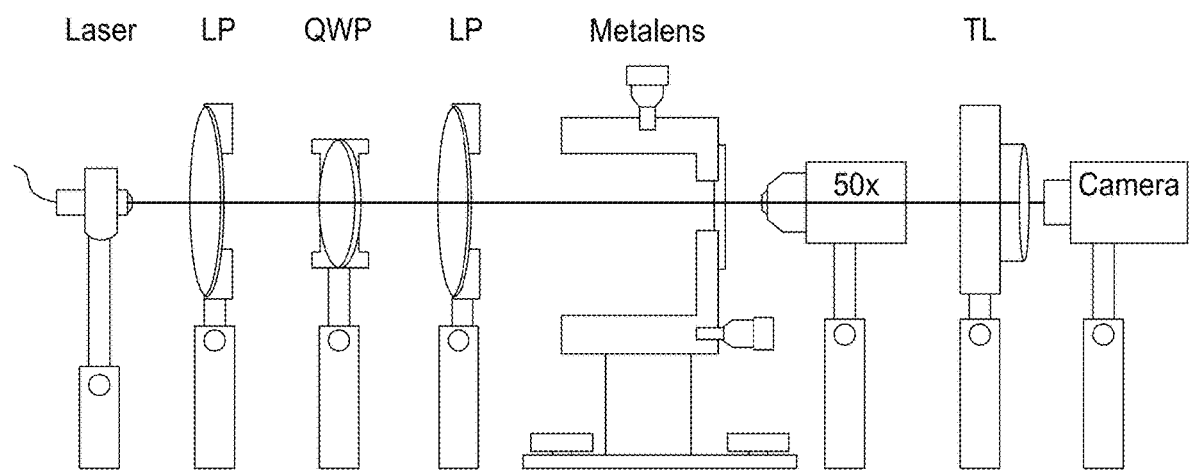
FIG. 7 illustrates a setup according to the present teachings, in that both metalens are characterized through a laser based optical system having diode laser, quarter waveplate (QWP), linear polarizer (LP), 3-axis motion mount, 50× objective, tube lens (TL), and a camera.

A schematic diagram of characterization setup is shown in FIG. 7. Diode laser of 685 nm light (LP685, Thorlabs Inc.) is applied as light source. The metalens sample is mounted on 3 directional motion system MT3A (Thorlabs Inc.) which is directly illuminated by the laser. The image is then magnified by an objective (Olympus LMPlanFLN 50×) and tube lens (Thorlabs TTL 200) system before captured by camera (Thorlabs 8051C, 8 megapixel).

The laser shed on the sample lens with spot size of around 10 mm which is much larger than the size of lens. When we focus on a 100×100 micrometers area, the incident source is considered as plane wave rather than a Gaussian beam. Before the fabrication of micro lens, several Au alignment marks (50×50 micron) are fabricated on the silica wafer with thickness around 20 nm. Those alignment marks will not only help us to find our structure in optical systems but also act as an important reference of scale. We first find the location of the micro lens and its nearest alignment mark. Then with fine adjustment of the sample stage (Thorlabs MT3A) in z direction, the objective is focused on the alignment mark. The characterization process starts with recording the z coordinate of the lens surface by focusing light at the alignment marks. Next step is to tune the x-y coordinate to move the field of view to lens area. Then the lens is moved carefully away from the objective while looking for the sharpest focus pattern generated by metalens. The focus is found where the focused pattern presenting maximum intensity. The focal length is acquired by calculating the distance moved from the lens surface to the focus in z direction. For the calculation of FWHM, because the pixel intensities are discreet, the exact pixel with half intensity of maximum do not exist. The FWHM presented here is calculated by taking linear approximation of adjacent pixels around half maximum intensity.

The measurement error mainly generates from: 1. The resolution of translation system (Thorlabs MT3A) is 0.5 micro meter. 2. When determine the z coordinate of the lens surface, the Au alignment mark has thickness of 0.02 micro meter, thus create an error of 0.02 micro meter (in worst case). 3. The sensitivity of the CMOS sensor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An on-chip optical metalens transmitting light, the metalens comprising:
a metasurface configured to focus light as a multi-point focused design pattern, wherein the multi-point design pattern is created using line- and ring-shaped focus patterns, the metasurface having a plurality of phase shifters configured according to the following phase profile equation:

$$\Phi(x, y) - \Phi(0, 0) = \frac{2\pi}{\lambda}\left(\sqrt{(x + a(y))^2 + f^2} - f\right)$$

where x and y are space coordinate, $\lambda$ is incident wavelength, f is focal length, and a(y) is a function of the coordinate y thereby defining the multi-point focused design pattern as a non-point pattern, the metasurface being made of a single layer of silicon-based material.

2. The metalens according to claim 1 wherein the metasurface comprises a continuous phase profile.

3. The metalens according to claim 1 wherein the plurality of phase shifters comprises a plurality of nano cylinders.

4. The metalens according to claim 1 wherein the plurality of phase shifters comprises a grating-based surface.

5. The metalens according to claim 1 wherein the multi-point focused design pattern comprises a homogeneous focused intensity.

6. The metalens according to claim 5 wherein the homogeneous focused intensity is based on a space-variant focal length modifier.

7. The metalens according to claim 1 wherein the plurality of phase shifters comprises a varying periodicity.

8. A metalens transmitting light to a multi-point design pattern, the metalens comprising:
an integrated planar structure configured to focus light into a multi-point focused design pattern, wherein the multi-point design pattern is created using a plurality of phase shifters configured according to the following phase profile equation:

$$\Phi(x, y) - \Phi(0, 0) = \frac{2\pi}{\lambda}\left(\sqrt{(x + a(y))^2 + f^2} - f\right)$$

where x and y are space coordinate, $\lambda$ is incident wavelength, f is focal length, and a(y) is a function of the coordinate y thereby defining the multi-point focused design pattern as a non-point pattern.

9. The metalens according to claim 8 wherein the integrated planar structure comprises a single layer of silicon-based material.

10. The metalens according to claim 8 wherein the metasurface comprises a continuous phase profile.

11. The metalens according to claim 8 wherein the plurality of phase shifters comprises a plurality of nano cylinders.

12. The metalens according to claim 8 wherein the plurality of phase shifters comprises a grating-based surface.

13. The metalens according to claim 8 wherein the multi-point focused design pattern comprises a homogeneous focused intensity.

14. The metalens according to claim 13 wherein the homogeneous focused intensity is based on a space-variant focal length modifier.

15. The metalens according to claim 8 wherein the plurality of phase shifters comprises a varying periodicity.

* * * * *